United States Patent
Saini

(10) Patent No.: US 11,452,949 B2
(45) Date of Patent: Sep. 27, 2022

(54) APPARATUS AND PROCESS FOR REMOVAL OF CARBON DIOXIDE FROM A GAS FLOW AND TREATMENT OF BRINE/WASTE WATER FROM OIL FIELDS

(71) Applicant: CSUB Auxiliary for Sponsored Programs Administration, Bakersfield, CA (US)

(72) Inventor: Dayanand Saini, Bakersfield, CA (US)

(73) Assignee: CSUB Auxiliary for Sponsored Programs Administration, Bakersfield, CA (US)

( * ) Notice: Subject to any disclaimer, the term of this patent is extended or adjusted under 35 U.S.C. 154(b) by 842 days.

(21) Appl. No.: 16/202,963

(22) Filed: Nov. 28, 2018

(65) Prior Publication Data
US 2019/0160395 A1    May 30, 2019

Related U.S. Application Data

(60) Provisional application No. 62/591,585, filed on Nov. 28, 2017.

(51) Int. Cl.
*B01D 17/02* (2006.01)
*B01D 53/73* (2006.01)
*B01D 47/06* (2006.01)
*B01D 45/12* (2006.01)
(Continued)

(52) U.S. Cl.
CPC ............... *B01D 17/02* (2013.01); *B01D 1/18* (2013.01); *B01D 17/0214* (2013.01);
(Continued)

(58) Field of Classification Search
CPC ...................................................... B01D 17/02
(Continued)

(56) References Cited

U.S. PATENT DOCUMENTS 4,069,117 A    1/1978 Cooper
4,424,068 A *  1/1984 McMillan ............... E21B 43/34
                                                     95/243
(Continued)

FOREIGN PATENT DOCUMENTS

AU    2012384397 A1    4/2015
EP    3717849          10/2020
(Continued)

OTHER PUBLICATIONS

Sasaki Hiroshi et al.; "Method and Device for Treating Saline Wastewater"; Bibliographic Data of WO2014006741 (A1); Jan. 9, 2014: http://worldwide.espacenet.com.
(Continued)

*Primary Examiner* — Nina Bhat
(74) *Attorney, Agent, or Firm* — Schwegman Lundberg & Woessner, P.A.

(57) ABSTRACT

Embodiments of the disclosure pertain to an apparatus comprising a phase separator configured to separate a mixture comprising (i) water containing NaCl and (ii) oil and/or gas into separate streams comprising the water, the oil (when oil is in the mixture), and the gas (when gas is in the mixture), an electrochemical membrane separation cell configured to separate sodium and chloride ions in the water stream to form a stream comprising a first sodium hydroxide solution and a stream comprising (i) hydrochloric acid and/or (ii) chlorine gas, a compressor configured to compress a gas containing $CO_2$, a spray dryer configured to mix aqueous NaOH and the compressed gas to form sodium carbonate, and a cyclone separator configured separate the sodium carbonate from any excess components of the aqueous NaOH and/or the compressed gas.

23 Claims, 2 Drawing Sheets

(51) Int. Cl.
*B01D 53/75* (2006.01)
*B01D 53/62* (2006.01)
*B01D 1/18* (2006.01)

(52) U.S. Cl.
CPC .............. *B01D 45/12* (2013.01); *B01D 47/06* (2013.01); *B01D 53/62* (2013.01); *B01D 53/73* (2013.01); *B01D 53/75* (2013.01); *B01D 2251/304* (2013.01); *B01D 2257/504* (2013.01); *B01D 2258/0283* (2013.01)

(58) Field of Classification Search
USPC ........................................................ 210/800
See application file for complete search history.

(56) References Cited

U.S. PATENT DOCUMENTS

| | | | |
|---|---|---|---|
| 7,749,476 B2 | 7/2010 | Constantz et al. | |
| 7,842,264 B2 | 11/2010 | Cooper et al. | |
| 7,964,170 B2 | 6/2011 | Singh | |
| 10,150,057 B2* | 12/2018 | Folkvang | B01D 17/0217 |
| 2007/0295604 A1* | 12/2007 | Freydina | C02F 1/469 |
| | | | 204/518 |
| 2011/0036728 A1* | 2/2011 | Farsad | H01M 4/38 |
| | | | 205/770 |
| 2011/0277474 A1* | 11/2011 | Constantz | B01D 53/1493 |
| | | | 60/643 |
| 2012/0211421 A1 | 8/2012 | Self et al. | |
| 2013/0008354 A1* | 1/2013 | Constantz | C25B 1/00 |
| | | | 106/801 |
| 2016/0045841 A1* | 2/2016 | Kaplan | B01D 53/48 |
| | | | 429/49 |
| 2018/0128250 A1* | 5/2018 | Iyer | B01D 17/0205 |
| 2019/0270660 A1* | 9/2019 | Schmidt | C02F 9/00 |

FOREIGN PATENT DOCUMENTS

| | | |
|---|---|---|
| WO | 2014000030 A1 | 1/2014 |
| WO | 2014006741 A1 | 1/2014 |
| WO | 2019108638 | 6/2019 |

OTHER PUBLICATIONS

Sasaki Hiroshi et al.; "Method and Device for Treating Saline Wastewater"; Bibliographic Data of AU2012384397 (A1); Jan. 29, 2015: http://worldwide.espacenet.com.

International Search Report and Written Opinion; PCT International Searching Authority/US dated Mar. 1, 2019, International Application No. PCT/US2018/062827; 8 pages; International Searching Authority/United States, Commissioner for Patents; Alexandria, Virginia.

"Chlorine"; Copyright 2016 (publication date unknown); 10 pgs.; Centre for Industry Education Collaboration; Department of Chemistry, University of York, UK; Downloaded on Jul. 5, 2017 from www.essentialchemicalindustry.org.

Martin Jakubec et al.; "Spray Drying"; Publication date unknown; 3 pgs.; Chobotix Chemical Robotics; Prague, Czech Republic; Downloaded on May 10, 2017 from www.chobotix.cz.

"Spray Drying"; May 10, 2017; 5 pgs.; Wikipedia; https://en.wikipedia.org.

Maryam Mahmoudkhani et al.; "Low-energy Sodium Hydroxide Recovery for CO2 Capture from Atmospheric Air-Thermodynamic Analysis"; Jul. 2009; 3 pgs.; vol. 3, Issue 4; International Journal of Greenhouse Gas Control; Elsevier; www.sciencedirect.com.

Joshuah K. Stolaroff et al.; "Carbon Dioxide Capture from Atmospheric Air Using Sodium Hydroxide Spray"; 2008; pp. 2728-2735; vol. 42, No. 8; Environmental Science & Technology; American Chemical Society.

Yadollah Tavan et al.; "A Novel Rate of the Reaction Between NaOH with CO2 at Low Temperature in Spray Dryer"; 2017; pp. 51-55; Petroleum 3; Elsevier B.V.

"International Application Serial No. PCT US2018 062827, International Preliminary Report on Patentability dated Jun. 11, 2020", 4 pgs.

"Indian Application Serial No. 202047027471, First Examination Report dated Nov. 5, 2021", 6 pgs.

"European Application Serial No. 18882635.8, Communication Pursuant to Article 94(3) EPC dated Dec. 22, 2021", 4 pgs.

"European Application Serial No. 18882635.8, Response to Communication pursuant to Rules 161(1) and 162 EPC filed Oct. 28, 2020", 13 pgs.

"European Application Serial No. 18882635.8, Extended European Search Report dated Mar. 26, 2021", 7 pgs.

"European Application Serial No. 18882635.8, Response filed Oct. 4, 2021 to Extended European Search Report dated Mar. 26, 2021", 13 pgs.

* cited by examiner

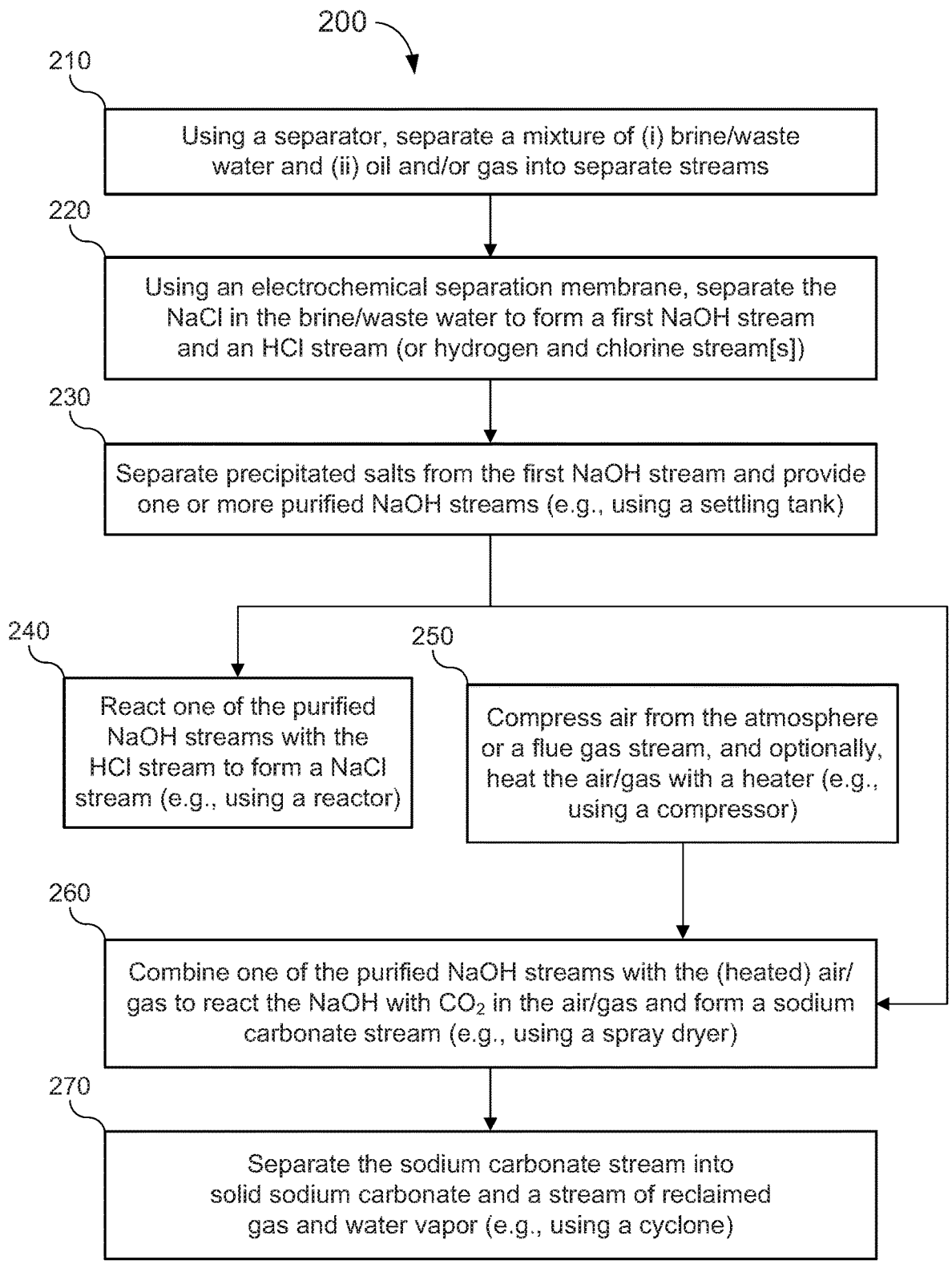

APPARATUS AND PROCESS FOR REMOVAL OF CARBON DIOXIDE FROM A GAS FLOW AND TREATMENT OF BRINE/WASTE WATER FROM OIL FIELDS

CROSS-REFERENCE TO RELATED APPLICATION

This application claims the benefit of U.S. Provisional Patent Application No. 62/591,585, filed on Nov. 28, 2017, incorporated herein by reference as if fully set forth herein.

FIELD OF THE INVENTION

The present invention generally relates to removal of carbon dioxide (e.g., from the atmosphere or a flue gas stream) and recovery of useful materials from oil field waste water.

DISCUSSION OF THE BACKGROUND

The extraction of hydrocarbons, such as oil and/or gas, from oil fields often uses brine, and produces waste water as a byproduct. Various dissolved salts, most commonly sodium chloride, may be present in such waste water. These dissolved salts may be converted into value-added chemicals, such as sodium hydroxide, hydrogen chloride, hydrogen gas or chlorine gas using electrochemical membrane separation technology. Since it is not always economical to transport the waste water from an oil field to a location for further processing the waste water, it would be advantageous to find a use for the waste water at the site of hydrocarbon extraction.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

In one aspect, the present invention relates to an apparatus comprising a phase separator configured to separate a mixture comprising (i) water containing NaCl and (ii) oil and/or gas into a first stream comprising the water, a second stream comprising the oil (when oil is in the mixture) and a third stream comprising the gas (when gas is in the mixture), an electrochemical membrane separation cell configured to separate sodium and chloride ions in the first stream to form a fourth stream comprising a first sodium hydroxide solution and a fifth stream comprising (i) hydrochloric acid and/or (ii) chlorine gas and optionally hydrogen gas, a compressor configured to compress a gas containing $CO_2$, a spray dryer configured to mix aqueous NaOH (directly or indirectly from the first sodium hydroxide solution) and the compressed gas to form sodium carbonate, and a cyclone separator configured separate the sodium carbonate from any excess components of the aqueous NaOH and/or the compressed gas. For example, the water in the mixture may comprise brine and/or waste water, which may be from an oil field or a hydrocarbon extraction.

In some embodiments, the mixture includes the water, the oil, and the gas, and the phase separator comprises a three-phase separator configured to separate the water, the oil and the gas into the first, second and third streams, respectively. The phase separator may comprise, for example, a horizontal or vertical separator. In some examples, the phase separator includes a coalescer.

In some embodiments, the fourth stream further contains salts. In such embodiments, the apparatus may further comprise a settling tank, configured to settle the salts that precipitate in or from the fourth stream to form precipitated salts and a sixth stream comprising a second sodium hydroxide solution. In other or further embodiments, the aqueous NaOH is the second sodium hydroxide solution. In such embodiments, the settling tank or the sixth stream may form a seventh stream comprising a third sodium hydroxide solution.

In some embodiments, the fifth stream comprises the hydrochloric acid, and the apparatus further comprises a reactor configured to react the hydrochloric acid solution in the fifth stream and the third sodium hydroxide solution in the eighth stream to form a ninth stream comprising a second sodium chloride solution.

In some embodiments, the apparatus further comprises an ion exchange resin regenerator, configured to receive the second sodium chloride solution directly or indirectly from the reactor. In other or further embodiments, the electrochemical separation cell comprises an anode, a cathode, and an ion permeable membrane. The ion permeable membrane may be permeable to cations.

In some embodiments, the apparatus further comprises a heater configured to heat the compressed gas. In other or further embodiments, the spray dryer may include a nozzle configured to eject the sodium carbonate, excess components of the aqueous NaOH and the compressed gas.

In some examples, the gas comprises air or a flue gas. The flue gas may be from a combustion process, a chemical process, an oil field or a hydrocarbon processing operation. When the flue gas is from the combustion process, the combustion process may involve a fireplace, oven, furnace, boiler, steam generator, or power plant.

In another aspect, the present invention relates to a method comprising separating a mixture comprising (i) water containing NaCl and (ii) oil and/or gas using a phase separator into a first stream comprising the water, a second stream comprising the oil (when oil is in the mixture), and a third stream comprising the gas (when the gas is in the mixture), separating sodium and chloride ions in the first stream using an electrochemical membrane to form a fourth stream comprising a first sodium hydroxide solution and a fifth stream comprising (i) hydrochloric acid and/or (ii) chlorine gas and optionally hydrogen gas, compressing a gas containing $CO_2$ (e.g., using a compressor), mixing aqueous NaOH (directly or indirectly from the first sodium hydroxide solution) and the compressed gas (e.g., using a spray dryer) to form sodium carbonate; and separating the sodium carbonate from any excess components of the aqueous NaOH and/or the compressed gas (e.g., using a cyclone separator).

When the mixture comprises the water, the oil, and the gas, the phase separator may comprise a three-phase separator, and separating the mixture may comprise separating the water, the oil and the gas using the three-phase separator to form the first, second and third streams. As for the present apparatus, the phase separator may comprise a horizontal or vertical separator, and in some cases, the phase separator may include a coalescer.

In various embodiments, the water in the mixture comprises brine or waste water, and the method may further comprise transporting or recovering the mixture from an oil field or a hydrocarbon extraction.

In some embodiments, the fourth stream contains precipitated salts. In such embodiments, the method may further comprise settling the precipitated salts in the fourth stream and separating the precipitated salts from the fourth stream to form a seventh stream comprising a second sodium hydroxide solution comprising the aqueous NaOH.

In some embodiments, the method further comprises forming an eighth stream comprising a third sodium hydroxide solution from the first NaOH solution, the seventh stream, or the aqueous NaOH. In other or further embodiments, the fifth stream comprises the hydrochloric acid, and the method further comprises reacting the hydrochloric acid and the third sodium hydroxide solution to form a second sodium chloride solution. In such other or further embodiments, the method may further comprise regenerating an ion exchange resin directly or indirectly with the second sodium chloride solution.

In some embodiments, the method further comprises heating the compressed gas. For example, the compressed gas may be heated to a temperature of up to 50° C. As for the present apparatus, in some embodiments, the spray dryer may include a nozzle configured to eject the sodium carbonate and compressed gas.

As for the present apparatus, in some embodiments, the electrochemical membrane may comprise an ion permeable membrane. The ion permeable membrane may be permeable to cations.

In various embodiments, the gas comprises air or a flue gas. In the latter case, the method may further comprise recovering the flue gas from a combustion process, a chemical process, an oil field or a hydrocarbon processing operation. When the flue gas is recovered from the combustion process, the combustion process may include burning or combusting one or more materials in a fireplace, oven, furnace, boiler, steam generator, or power plant.

Advantages of the present invention will become readily apparent from the detailed description of various embodiments below.

BRIEF DESCRIPTION OF THE DRAWINGS

FIG. 2 is a flowchart showing an exemplary method of treatment of oil field waste water and removal of carbon dioxide from a gas flow in accordance with one or more embodiments of the present invention.

DETAILED DESCRIPTION

Figure 1:
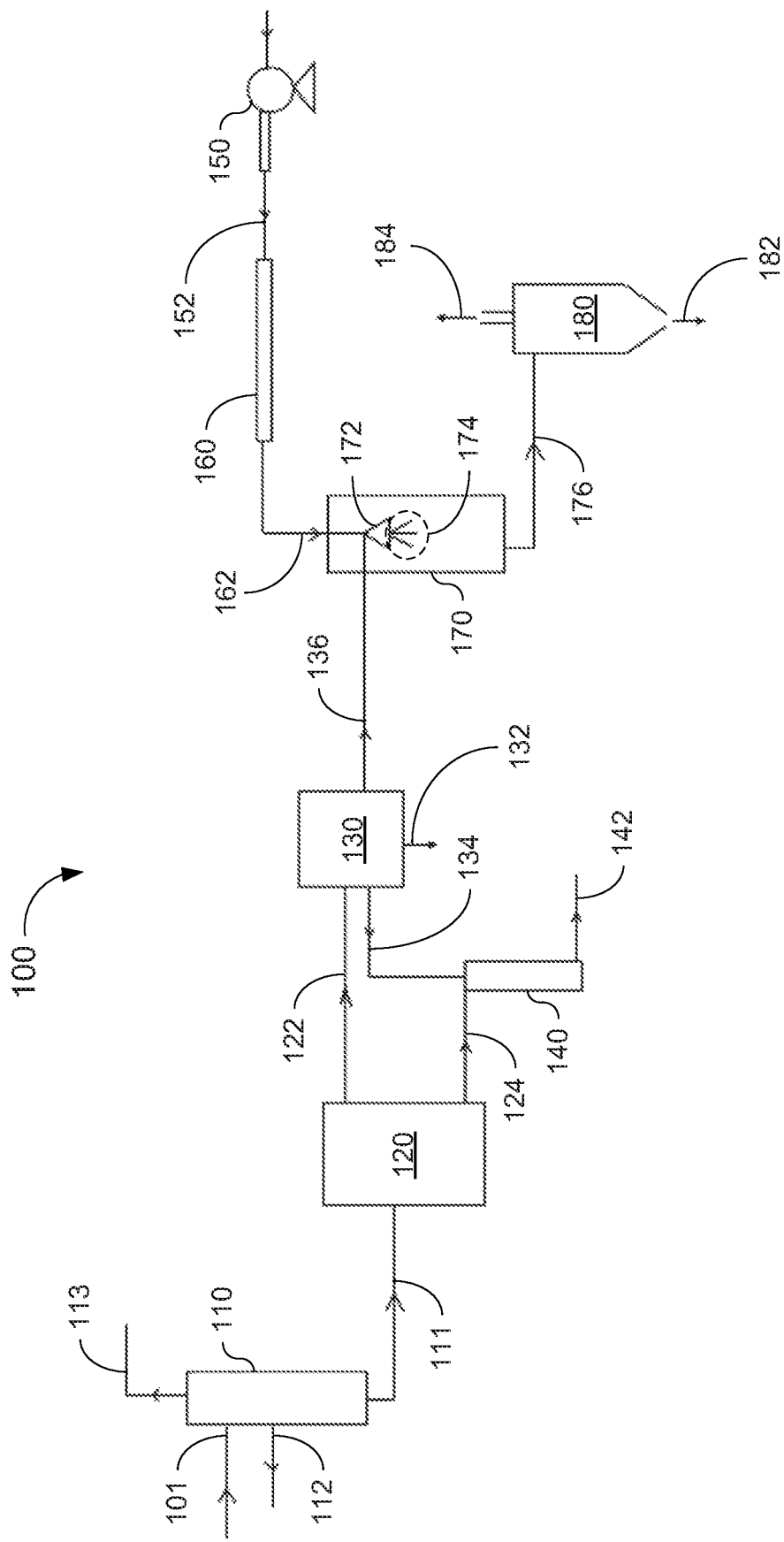
FIG. 1 shows an exemplary apparatus comprising a three-phase separator, an electrochemical membrane separation cell, a settling tank, a reactor, a compressor, a heater, a spray dryer and a cyclone separator in accordance with one or more embodiments of the present invention.

Reference will now be made in detail to various embodiments of the invention, examples of which are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention as defined by the appended claims. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

A "stream" generally refers to a stream of material(s), but can also refer herein to a conduit and any necessary pumping device or impeller that transports a stream of materials.

The removal of carbon dioxide from a gas stream may be desirable (e.g., to prevent the carbon dioxide from escaping into the atmosphere and contributing to climate change as a greenhouse gas). This removal is often accomplished by reacting the carbon dioxide with a base such as sodium hydroxide to form sodium carbonate. Since the electrolysis of brine (e.g., oil field waste water) can produce sodium hydroxide, it may be advantageous to remove carbon dioxide from a gas using sodium hydroxide produced from oil field waste water. Thus, the present invention relates to an apparatus and method for recovery of materials (e.g., chemicals) from oil field waste water (e.g., brine) and removal of carbon dioxide from a gas flow using at least some of the recovered materials.

An Exemplary Apparatus for Oil Field Waste Water Treatment and $CO_2$ Removal

FIG. 1 shows an exemplary apparatus 100 comprising a three-phase separator 110, an electrochemical membrane separation cell 120, a settling tank 130, a reactor 140, a compressor 150, a heater 160, a spray dryer 170 and a cyclone separator 180.

The phase separator 110 may comprise a "water knockout" separator, and is configured to separate a mixture comprising brine (e.g., oil field waste water), oil and/or other liquid-phase hydrocarbon(s), and gas from a well stream 101 into a first stream 111 comprising the brine (waste water), a second stream 112 comprising liquid-phase, water-insoluble materials (e.g., the oil and/or liquid-phase hydrocarbons), and a third stream 113 comprising the gas-phase materials. The phase separator 110 may also comprise a horizontal cylindrical separator with its long axis parallel to the ground, or a vertical cylindrical separator with its long axis perpendicular to the ground. The phase separator 110 may include or be connected to a plurality of deflecting plates, a coalescer, one or more pressure relief valves, a mist extractor, a gas outlet, a water outlet, an oil outlet, one or more vortex breakers, a water level controller, an oil level controller, a water meter, an oil meter, and/or a gas meter. In alternative embodiments, the well stream 101 may comprise only brine (waste water), or (i) brine and (ii) oil or gas. The second stream 112 may be received in a storage tank for storing the oil. The third stream 113 may be connected to a gas line for further processing of the gas. The first stream 111, the second stream 112 and the third stream 113 may utilize one or more pumps to propel fluid therein.

The electrochemical membrane separation cell 120 is configured to separate sodium and chloride ions in the waste water into sodium hydroxide (NaOH) and either (i) hydrogen chloride (HCl) or (ii) chlorine gas ($Cl_2$) and optionally hydrogen gas ($H_2$) by electrolysis, and may comprise a cathode, an anode, and an ion-permeable membrane. The electrochemical membrane separation cell 120 may receive the first stream 111 comprising the waste water (including NaCl), and form a fourth stream 122 comprising a first NaOH solution and a fifth stream 124 comprising an HCl solution when an electrical current is applied to the cathode and anode. The fourth stream 122 may further comprise precipitated salts (e.g. non-sodium hydroxides, sodium and non-sodium carbonates and/or phosphates, etc.). In one embodiment, an HCl oven or burner may be configured to combine any $Cl_2$ and $H_2$ gases evolved in the electrochemical membrane separation cell 120 to form HCl. In alternative embodiments, the electrochemical membrane separation cell 120 may form one or more streams of hydrogen gas and/or chlorine gas, instead of or in addition to the fifth stream 124. If hydrogen and chlorine gas are combined in one stream, the gases may be separated (e.g., by selective condensation of chlorine gas on a condenser or other surface having a temperature between the boiling points of chlorine and hydrogen). The fourth stream 122 and/or the fifth stream 124 may utilize one or more pumps to propel the fluid therein.

The anode may comprise titanium or another metal, and a coating (e.g., ruthenium dioxide) thereon. The cathode may comprise nickel or another metal, and optionally a coating (e.g., to reduce energy consumption) thereon. The anode and cathode compartments are generally completely separated by an ion-permeable membrane. In one embodiment, the membrane is permeable to cations, but not anions, allowing the passage of sodium ions and protons, but not chloride or hydroxide ions. Sodium ions pass through in hydrated form $(Na_xH_2O)^+$, so some water is transferred. However, the membrane may be impermeable to free water molecules.

The first NaOH solution leaving the cell may have a concentration in excess of 25% (e.g., about 30%) by weight (w/w), and may be further concentrated by evaporation using steam, under pressure, until the solution has a concentration of 45% or more (e.g., 48-50%) by weight (w/w), an ideal concentration for ease of transportation and storage. The membrane may be a co-polymer of tetrafluoroethene and/or a similar fluorinated monomer with anionic (e.g., carboxylate and/or sulfonate) groups.

In alternative embodiments, the electrochemical membrane separation cell 120 may use an oxygen-depolarized cathode (ODC) to produce chlorine. When hydrogen ions migrate to the cathode, hydrogen gas is liberated. However, if oxygen is pumped into this part of the cell 120, the hydrogen reacts to form water, and the voltage needed for electrolysis is reduced significantly (e.g., by about a third), reducing power costs. This is a significant advantage, as electricity accounts for a large fraction of the total cost of recovery. In an alternative embodiment, a solar-powered voltage supply can be used. This is another significant advantage, as it makes the invention environmentally sustainable. A disadvantage of the ODC is that the hydrogen is no longer available as a by-product (e.g., to combine with chlorine gas to form HCl). Additionally, oxygen is consumed as an additional raw material, but the oxygen can be obtained from air (instead of being supplied from a tank).

The settling tank 130 is configured to receive the fourth stream 122, including the first NaOH solution (and optionally the precipitated salts), and settle any precipitated salts to form a layer of NaOH solution and an underlying layer of precipitated salts. The settling tank 130 may include a scraper configured to push the layer of precipitated salts (e.g., to one end of the tank 130). The settling tank 130 forms a sixth stream 132 comprising the precipitated salts, a seventh stream 134 comprising a second NaOH solution, and an eighth stream 136 comprising a third NaOH solution.

The reactor 140 is configured to react the HCl solution in the fifth stream 124 and the second NaOH solution in the seventh stream 134 to form a ninth stream 142 comprising a second NaCl solution. The reactor 140 may be a batch reactor, a continuous reactor, a tubular reactor, a fixed bed reactor, a fluid bed reactor, or a continuous stirred reactor. The reactor 140 may include a heat exchanger that supplies heat to speed up the reaction or removes heat from the reaction (which can be stored as energy for driving another process, such as electricity generation). The second NaCl solution in the ninth stream 142 may be used for various purposes (e.g., to regenerate an ion exchange resin, to make solid NaCl, etc.). Alternatively, the second NaCl solution may be used in various processes, including the manufacture of food products, plastics, paper, soap, aluminum, etc.

The compressor 150 is configured receive a gas (e.g., air or a $CO_2$-containing gas from a gas source), and compress the gas to form a compressed gas 152 in a gas conduit. The gas may be or comprise air (e.g., from the atmosphere) or a flue gas stream (e.g., from a chemical reactor, a combustion process, etc.). The compressor 150 may be a rotary compressor (e.g., a lobe, screw, liquid ring, scroll, or vane compressor), a reciprocating compressor (e.g., a diaphragm, single acting, or double acting compressor), an axial compressor, a centrifugal compressor, an axi-centrifugal compressor or a mixed-flow compressor. The compressor 150 may be powered by electricity (which may be at least partially from electricity generated from the stored thermal energy from the reactor 140), and may include a cooling system with a coolant that circulates around the compressor to remove heat.

The heater 160 is configured to receive and further heat the compressed gas 152 to form a heated gas 162. The heater 160 may include electric heating elements or a circulating warm liquid that heats the compressed gas 152. In some embodiments, the heater 160 may heat the compressed gas 152 to a temperature up to 50° C. (e.g., from room temperature).

The spray dryer 170 is configured to mix the third NaOH solution in the eighth stream 136 with the heated gas 162 to form a sodium carbonate stream 176. The spray dryer 170 ejects the third NaOH solution from a nozzle 172 as a mist 174 (e.g., a fine mist having a particle size of 20 to 180 μm). The $CO_2$ in the heated gas 162 undergoes a reactive absorption reaction with the NaOH to form sodium carbonate ($Na_2CO_3$) in the mist 174. The nozzle 172 may be a rotary disk nozzle, a single-fluid high pressure swirl nozzle, or an atomizer wheel nozzle. Alternatively, the nozzle may be a two-fluid or ultrasonic nozzle. A pump may be used to increase the pressure of the eighth stream 136 out of the nozzle. The spray dryer 170 may include a drying chamber to dry the sodium carbonate stream 176. The sodium carbonate stream 176 (which may be partially or completely dried) may then be transferred to the cyclone separator 180 for further drying. In some embodiments, 90% or more, 95% or more, or 99% or more of the carbon dioxide is removed from the heated gas 162.

In alternative embodiments, the spray dryer 170 may be any gas/liquid contactor capable of removing carbon dioxide from the gas source, such as a spray tower, a tray tower, or a packed bed tower. In alternative embodiments, the sodium carbonate stream 176 may be fed into a second spray dryer 170 (or any gas/liquid contactor) in series with the first spray dryer 170 to further react any remaining NaOH with the $CO_2$ in the heated gas 162. The spray dryer 170 may be designed for vertical or horizontal flow of the heated gas 162 and for either countercurrent, co-current or cross-current flow of the heated gas 162 relative to the flow of the eighth stream 136. In alternative embodiments, a tank may be attached to the spray dryer 170 for holding the third NaOH solution. In order to keep the pH of the third NaOH solution relatively alkaline (e.g., equal or greater than a pH of 8.5), the tank may be configured to allow water in the third NaOH solution to evaporate.

In one embodiment, the tank holding the third NaOH solution may also hold a catalyst that catalyzes the absorption of carbon dioxide in the heated gas 162. Alternatively, the catalyst may be added directly to the eighth stream 136. The carbon dioxide absorption rate may be limited more by the relatively low rate of reaction of the carbon dioxide in the liquid phase after it has been absorbed than by the diffusion rate of $CO_2$ through the gas/liquid interface. Therefore, the reaction rate within the liquid phase can be increased by the use of the catalyst. In particular, it is believed that the catalyst increases the rate of reaction of carbonic acid and sodium bicarbonate with the NaOH. The catalyst may also include a catalyst that increases the rate of absorption of carbon dioxide across the gas/liquid interface. For example, the catalyst may comprise levulose, dextrose, sucrose, lactose, ethylene glycol, glycerol, methyl alcohol, ethyl alcohol, formaldehyde, or a mixture thereof. The amount or concentration of catalyst necessary in the third NaOH solution is any amount or concentration that improves the rate of carbon dioxide removal from the heated gas 162. In some embodiments, the concentration of the catalyst is present in an amount of from approximately 0.01% to approximately 1.0% by weight or by moles of NaOH in the third NaOH solution. In various embodiments, the eighth stream 136 is heated or cooled (as desired or necessary) in order to increase the rate of absorption of $CO_2$.

The cyclone separator 180 is configured to receive and separate the sodium carbonate stream 172 into solid sodium carbonate 182 and a reclaimed water stream 184 using vortex separation (e.g., a hydrocyclone). Rotational effects and gravity separate the mixture of solid and fluid (gas) in the sodium carbonate stream 172, and no filters are necessary. A high-speed rotating flow is established within the cylindrical or conical container of the cyclone separator 180. A gas (e.g., in the $Na_2CO_3$ stream and/or pumped air) flows in a helical pattern, beginning at the top (wide end) of the cyclone and ending at the bottom (narrow) end before exiting the cyclone in a straight stream through the center of the cyclone and out the top. Larger (denser) particles in the rotating stream have too much inertia to follow the tight curve of the stream, and strike the outside wall, and subsequently fall to the bottom of the cyclone where they may be removed. In a conical system, as the rotating flow moves towards the narrow end of the cyclone, the rotational radius of the stream is reduced, thus separating smaller and smaller particles. The geometry of the cyclone separator 180, together with flow rate, defines the cut point of the cyclone separator 180, which is the size of particle that may be removed from the stream with a 50% efficiency. Particles larger than the cut point may be removed with a greater efficiency, and smaller particles may be removed with a lower efficiency.

An alternative design for the cyclone separator 180 uses a secondary flow within the cyclone to keep the collected particles from striking the walls, protecting them from abrasion. The primary flow containing particulates enters from the bottom of the cyclone and is forced into spiral rotation by stationary spinner vanes. The secondary air flow enters from the top of the cyclone and moves downward toward the bottom, intercepting the particulate from the primary air. Since the secondary air flow pushes the particulates toward the collection area, and does not rely solely on gravity to perform this function, the secondary air flow allows the collector to be optionally mounted horizontally.

Exemplary Method of Treating Oil-Field Water and Removing $CO_2$ from a Gas Source At 210, a phase separator may be used to separate a mixture of brine and/or waste water containing NaCl, oil and gas into separate streams. If the separator is a three-phase separator, the brine and/or waste water, oil, and gas may be separated into separate streams. If the separator is a two-phase separator, the brine and/or waste water may be separated into one stream, and either oil or gas may be separated into another stream. The brine and/or waste water may be retrieved from a source other than an oil field (e.g., food processing, sea water, a salt flat, etc.).

At 220, an electrochemical separation membrane may be used to separate the Na and Cl ions in the brine and/or waste water to form a first NaOH stream and an HCl stream. Alternatively, one or more streams of chlorine gas and optionally hydrogen gas may be formed instead of the HCl stream. An HCl oven or burner may be configured to chemically combine any $Cl_2$ and $H_2$ gases evolved in the electrochemical membrane separation cell to form HCl. If the hydrogen and chlorine gases are combined in one stream, the gases may be separated (e.g., by selective condensation of chlorine gas on a condenser or other surface having a temperature between the boiling points of chlorine and hydrogen).

Optionally, at 230, any salts precipitating from the first NaOH stream may be separated (e.g., in a settling tank) to provide one or more purified NaOH streams. After allowing the precipitated salts to settle (e.g., on the bottom of the settling tank, by gravity), the method may further include scraping and/or pushing the layer of precipitated salts to one end of the tank to collect the precipitated salts. The precipitated salts may be as described above, and the method may further comprise purifying one or more of the precipitated salts and/or separating different precipitated salts from each other.

Optionally, at 240, one of the purified NaOH streams may be reacted with the HCl stream to form NaCl (e.g., in a reactor). In the absence of the reactor, the method may recover byproducts (e.g., $Cl_2$ gas, or $Cl_2$ and $H_2$ gases) from the electrochemical ion separation in 220. In further embodiments, the method may further comprise storing heat from the reaction of the NaOH with the HCl, and generating electricity from the stored heat.

At 250, a gas containing $CO_2$ (e.g., air, a combustion gas, a flue gas from a chemical reaction, etc.) is compressed (e.g., using a gas compressor). The gas compressor may compress the gas to a pressure of from 1 bar to 300 bars. Optionally, the air may be heated (e.g., up to about 50° C., using a heater) before or after compression.

At 260, one of the purified NaOH streams is combined with the (heated) compressed gas to react the NaOH in the purified stream with $CO_2$ in the gas and form sodium carbonate. In various embodiments, a spray dryer is used to combine the purified NaOH stream with the compressed gas to form a $Na_2CO_3$ stream. Alternatively, a vat, tank or bed in which one of the purified NaOH streams is stirred or flowed may be used to combine the NaOH with the compressed gas to form $Na_2CO_3$.

At 270, the sodium carbonate is separated into solid sodium carbonate and a stream of reclaimed water vapor and other gases (as may be present). In various embodiments, a cyclone separator may be used to perform the separation (see the above discussion of the cyclone separator 180 in FIG. 1).

CONCLUSION/SUMMARY

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus for separating useful material from an oil field fluid waste mixture comprising:
   a phase separator;
   an electrochemical membrane separation cell;
   a compressor;
   a spray dryer; and
   a cyclone separator;
   wherein a stream comprising an oil field fluid waste mixture is fluidly connected with the phase separator, which separates the fluid waste mixture into a water stream comprising a first NaCl solution and at least one stream selected from the group consisting of an oil stream and a gas stream, and mixtures thereof;
   wherein the water stream comprising the first NaCl solution is fluidly connected to the electrochemical membrane separation cell, which separates the water stream containing the first NaCl solution into a stream comprising a first aqueous sodium hydroxide solution and a stream including one or more materials selected from the group consisting of hydrochloric acid, chlorine gas, and mixtures thereof
   wherein a gas comprising carbon dioxide is in operative communication with the compressor, which compresses the gas comprising carbon dioxide;
   wherein a stream comprising a second aqueous sodium hydroxide solution, which includes a first portion of the sodium hydroxide from the first sodium hydroxide solution, is fluidly connected to the spray dryer;
   wherein the compressed gas is fluidly connected to the spray dryer;
   wherein the spray dryer mixes the second aqueous sodium hydroxide solution and the compressed gas to form a stream comprising sodium carbonate; and
   wherein the stream comprising sodium carbonate is fluidly connected to the cyclone separator, which separates the sodium carbonate from the stream comprising sodium carbonate into solid sodium carbonate and a reclaimed water stream.

2. The apparatus of claim 1, wherein the fluid waste mixture of fluid from refinery or wellbores is selected from the group consisting of water, oil, and gas, and wherein the phase separator comprises a three-phase separator, which separates the aqueous brine fluid stream into the water stream comprising the first NaCl solution, the oil stream and the gas stream, respectively.

3. The apparatus of claim 1, wherein the phase separator is selected from the group consisting of a horizontal separator, a vertical separator, and a coalescer.

4. The apparatus of claim 1, wherein the fluid waste mixture includes water selected from the group consisting of brine and waste water.

5. The apparatus of claim 1, wherein the stream comprising the first sodium hydroxide solution stream further comprises one or more salts selected from the group consisting of non-sodium hydroxides, sodium, and phosphates and mixtures thereof.

6. The apparatus of claim 5, further comprising:
   a settling tank;
   wherein the stream comprising the first aqueous sodium hydroxide solution is fluidly connected to the settling tank, which settles the salts that precipitate in or from the stream comprising the first aqueous sodium hydroxide solution, to form a stream that comprises precipitated salts and to form the stream comprising the second aqueous sodium hydroxide solution and to form a stream that comprises a third aqueous sodium hydroxide solution, which includes a second portion of the sodium hydroxide from the first aqueous sodium hydroxide solution.

7. The apparatus of claim 6, further comprising:
   a reactor;
   wherein the stream including one or more materials selected from the group consisting of hydrochloric acid, chlorine gas, and mixtures thereof, is fluidly connected to the reactor;
   wherein the stream that includes a third aqueous sodium hydroxide solution is fluidly connected to the reactor; and
   wherein the reactor reacts the stream including one or more materials selected from the group consisting of hydrochloric acid and chlorine gas, and mixtures thereof and the third aqueous sodium hydroxide solution to form a stream comprising a second aqueous sodium chloride solution.

8. The apparatus of claim 7 further including:
   ion exchange resin generator;
   wherein the stream comprising a second sodium chloride solution is in fluid communication with the ion exchange resin generator, which produces solid sodium chloride from the second sodium chloride solution.

9. The apparatus of claim 1, wherein the electrochemical separation cell comprises an anode, a cathode, and an ion permeable membrane, and the ion permeable membrane is permeable to cations.

10. The apparatus of claim 1, further comprising a heater configured to heat the compressed gas.

11. The apparatus of claim 1, wherein the gas comprising carbon dioxide is selected from the group consisting of air and a flue gas.

12. The apparatus of claim 1, wherein the spray dryer includes a nozzle, which ejects the sodium carbonate included in the stream comprising the second aqueous sodium carbonate solution, the compressed gas, and excess components of the aqueous sodium hydroxide selected from a group consisting of brine, waste water, and mixtures thereof.

13. The apparatus of claim 1 further including:
a heater;
wherein the compressed gas comprising carbon dioxide is fluidly connected to the heater, which heats the compressed gas.

14. A method for separating useful material from an oil field fluid waste mixture, comprising:
using a phase separator, separating a fluid waste mixture comprising water comprising a first NaCl solution and a material selected from the group consisting of oil and gas, into a stream comprising the water the first NaCl solution, and when oil is a material in the fluid waste mixture, a stream comprising the oil, and when gas is a material in the fluid waste mixture, a stream comprising the gas;
using an electrochemical membrane, separating sodium ions in the stream comprising water and the first NaCl to form a stream comprising a first aqueous sodium hydroxide solution and a stream including one or more materials selected from the group consisting of hydrochloric acid, chlorine gas, and mixtures thereof;
compressing a gas comprising $CO_2$;
forming a stream comprising a second aqueous sodium hydroxide solution from the first aqueous sodium hydroxide solution;
mixing the second aqueous sodium hydroxide solution solution and the compressed gas to form sodium carbonate; and
separating the sodium carbonate from any excess components of the second aqueous sodium hydroxide solution, the excess components selected from a group consisting of brine, waste water, and mixtures thereof.

15. The method of claim 14, wherein the mixture comprises the water, the oil, and the gas, the phase separator comprises a three-phase separator, and separating the mixture comprises separating the water, the oil and the gas using the three-phase separator to form the water stream, the oil stream and the gas stream.

16. The method of claim 14, wherein the water in the mixture comprises a material selected from the group consisting of brine and waste water.

17. The method of claim 16, further comprising:
receiving the mixture from a source selected from the group consisting of an oil field and a hydrocarbon extraction.

18. The method of claim 14,
wherein the stream comprising the first aqueous sodium hydroxide solution comprises precipitated salts, and the method further comprises:
settling the precipitated salts in the stream comprising the first aqueous sodium hydroxide solution; and
separating the precipitated salts from the stream comprising the first aqueous sodium hydroxide solution to form the stream comprising the second aqueous sodium hydroxide solution.

19. The method of claim 18, further comprising:
forming a stream comprising a third aqueous sodium hydroxide solution from the first aqueous sodium hydroxide solution;
reacting hydrochloric acid from the stream including one or more materials selected from the group consisting of hydrochloric acid, chlorine gas, and mixtures thereof, and the third aqueous sodium hydroxide solution to form a second sodium chloride solution.

20. The method of claim 19 further including:
regenerating an ion exchange resin directly or indirectly with the second sodium chloride solution.

21. The method of claim 14, wherein the gas comprising carbon dioxide is selected from the group consisting of air and a flue gas.

22. The method of claim 21,
wherein the gas comprising carbon dioxide comprises the flue gas, and the method further comprises:
recovering the flue gas from a process selected from a group consisting of a combustion process, a chemical process, an oil field, and a hydrocarbon processing operation.

23. The method of claim 14, further comprising:
heating the compressed gas.

* * * * *